(12) United States Patent
Huang et al.

(10) Patent No.: US 7,729,066 B2
(45) Date of Patent: Jun. 1, 2010

(54) LENS UNIT

(75) Inventors: Ching-Hsing Huang, Taipei Hsien (TW); Cheng-Fa Weng, Taipei Hsien (TW); Jen-Te Wang, Taipei Hsien (TW); Huai-Chao You, Shenzhen (CN); Da-Yi Wen, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 72 days.

(21) Appl. No.: 12/189,131

(22) Filed: Aug. 8, 2008

(65) Prior Publication Data

US 2009/0290241 A1 Nov. 26, 2009

(30) Foreign Application Priority Data

May 23, 2008 (CN) ......................... 2008 1 0067418

(51) Int. Cl.
G02B 7/02 (2006.01)
(52) U.S. Cl. ....................................... 359/819; 359/823
(58) Field of Classification Search ......... 359/694–701, 359/819–824; 396/55, 133
See application file for complete search history.

(56) References Cited

U.S. PATENT DOCUMENTS

| 6,631,042 B2 * | 10/2003 | Noguchi ...................... 359/823 |
| 7,433,136 B2 * | 10/2008 | Ichikawa et al. ............ 359/811 |
| 2006/0181748 A1 | 8/2006 | Makii et al. ................... 396/55 |

\* cited by examiner

Primary Examiner—Mohammed Hasan
(74) Attorney, Agent, or Firm—Frank R. Niranjan

(57) ABSTRACT

A lens unit includes a moveable section and an elastic element. The moveable section includes a lens barrel, a lens received in the lens barrel and a magnet fixedly mounted around the lens barrel. The moveable section is configured to telescopically move along an optical axis direction of the lens. The elastic element includes an attachment portion connecting with the moveable section, a holding portion for holding the movable section, and a plurality of elastic ribs capable of being elastically deformed during the telescopic movement of the moveable section. The elastic ribs of the elastic element are configured to restrain a movement of the moveable section, whereby the moveable section can stop at a focal position when an elastic force generated by the deformation of the at least one elastic rib is equal to a force for causing the moveable section to have the telescopic movement.

13 Claims, 9 Drawing Sheets

— LENS UNIT —

BACKGROUND

1. Technical Field

The present invention relates to lens units, and particularly to a camera module with the lens unit for use in a digital camera or a portable electronic apparatus such as a mobile telephone, a personal digital assistant, etc.

2. Description of Related Art

A lens unit, which is constructed by disposing an optical system such as a lens in a lens barrel, is included in various types of camera modules for use in a video camera, a still camera, a mobile phone, a personal digital assistant, a notebook computer, etc. An example of such a camera module is one that is equipped with a movable section having a movable lens for zooming or focusing, in which the movable section can be moved by a linear actuator in an optical axis direction of the lens. The movable section is supported by a pair of guide shafts, to be movable in the optical axis direction. The movable section is guided by the pair of guide shafts and moves in the optical axis direction by a drive of the linear actuator.

However, the above-mentioned camera module which has the guiding shafts for guiding the movable section has some technical issues: it requires a space for accommodating the guiding shafts; such a space deviates from a compact requirement for the camera module. Furthermore, it requires a clearance of several microns between the movable section and the guiding shafts for enabling the movable section to move smoothly on the guiding shafts. However, such a clearance may cause the movable section to have a lateral movement and/or an inclination with respect to the optical axis during the movement of the movable section on the guiding shafts. Such a lateral movement and inclination of the movable section may cause deterioration in quality of a captured image because an image focal point may deviate or a so-called image-shake phenomenon may be generated.

Accordingly, it is desirable to realize reduction of size in a lens unit including a movable section and/or an camera module having such a lens unit. Furthermore, it is desirable to improve reliability of operation of a movable section included in a lens unit and/or a camera module including such a lens unit. The present invention is conceived in view of the above-described technical issues.

SUMMARY

The present invention relates to a lens unit. According to an exemplary embodiment of the present invention, the lens unit includes a moveable section and an elastic element. The moveable section includes a lens barrel, a lens received in the lens barrel and a magnet fixedly mounted around an outer periphery of the lens barrel. The moveable section is configured to have a telescopic movement along an optical axis direction of the lens. The elastic element includes an attachment portion for connecting with the moveable section, a holding portion for being fixed to a stationary part, such as a stator, thereby holding the movable section, and at least one elastic rib capable of being elastically deformed during the telescopic movement of the moveable section. The at least one elastic rib of the elastic element is configured to restrain a movement of the moveable section; thus, the moveable section can stop at a focal position when an elastic force generated by the deformation of the at least one elastic rib and a force causing the moveable section to have the telescopic movement come to a balance.

Other advantages and novel features of the present invention will become more apparent from the following detailed description of embodiment when taken in conjunction with the accompanying drawings.

DETAILED DESCRIPTION OF THE EMBODIMENTS

Reference will now be made to the drawings to describe the various present embodiments in detail.

Figure 1:
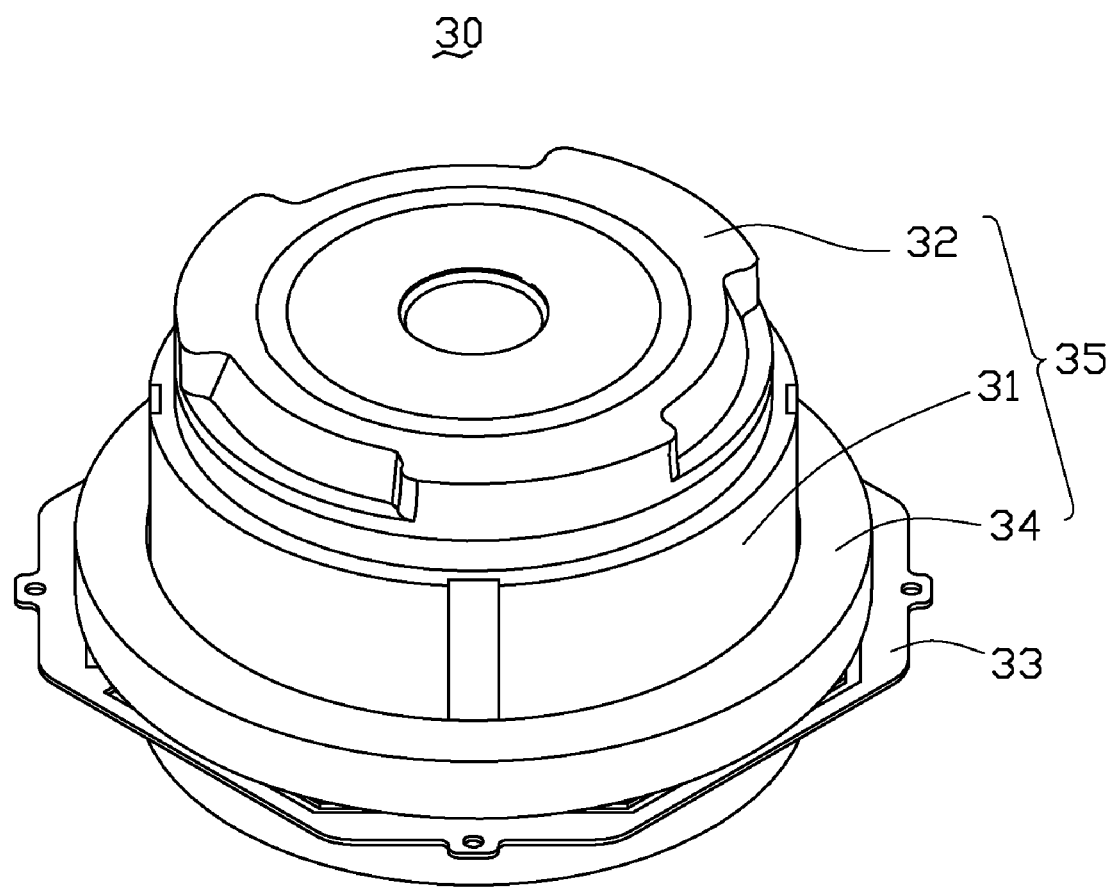
FIG. 1 is an assembled, isometric view showing a lens unit in accordance with a first exemplary embodiment of the present invention.
Figure 2:
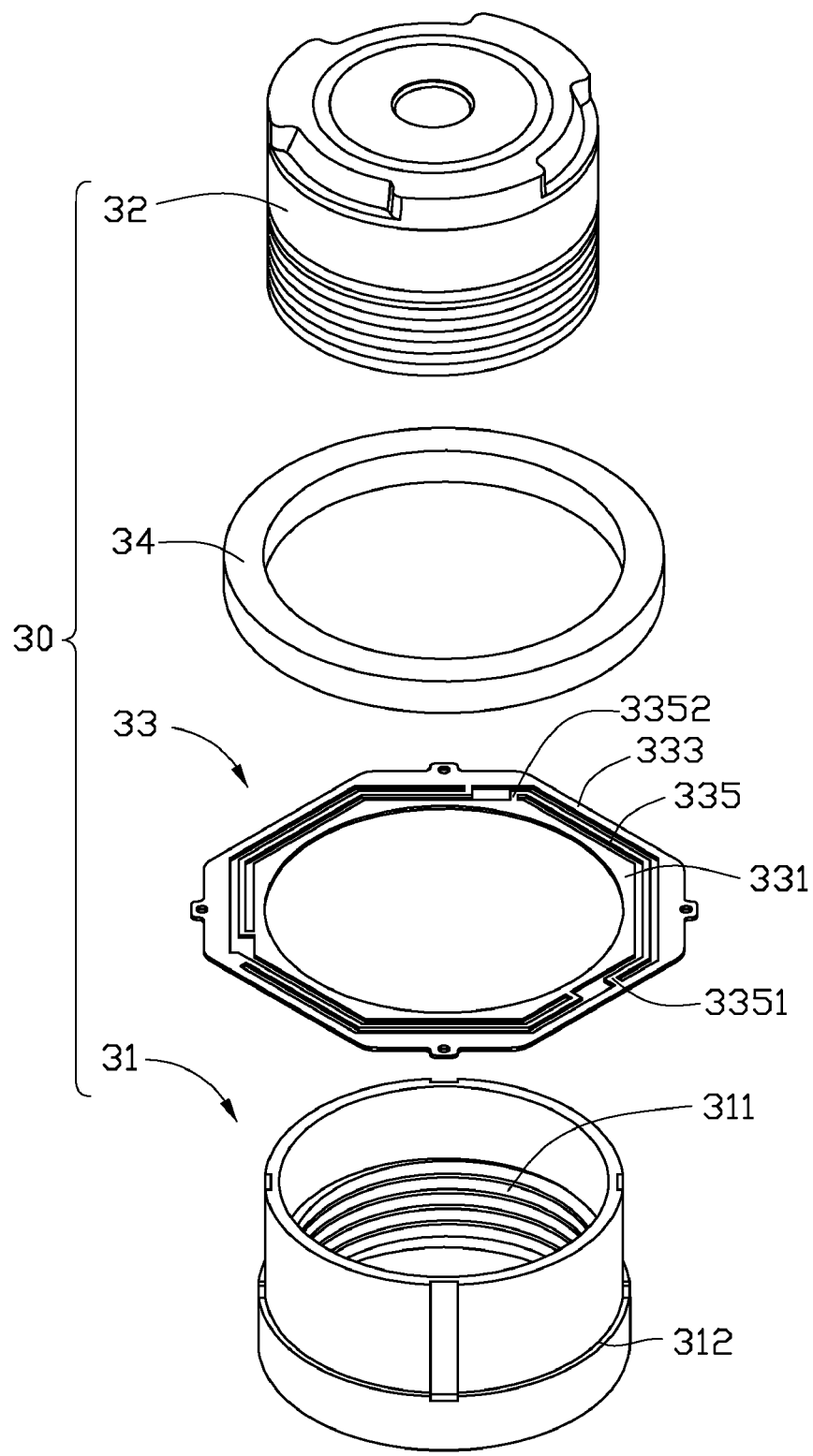
FIG. 2 is an exploded, isometric view of the lens unit of FIG. 1.

Referring to FIGS. 1-2, a lens unit 30 according to a first exemplary embodiment of the present invention including a moveable section 35 and an elastic element 33. The moveable section 35 includes a tubular lens barrel 31, a substantially cylindrical lens 32 fixedly received in the lens barrel 31 and an annular magnet 34 fixedly mounted around an outer periphery of the lens barrel 31.

An outer diameter of a top end of the lens barrel 31 is smaller than an outer diameter of a bottom end of the lens barrel 31. An annular supporting step 312 is thus formed on an outer circumference surface of the lens barrel 31 between the top end and the bottom end thereof. A plurality of first screw threads (not labeled) are formed on an inner surface of the lens barrel 31. A plurality of the second screw threads (not labeled) are formed on an outer circumference surface of the lens 32. The first screw threads are screwed into the second screw threads to connect the lens barrel 31 and the lens 32 together.

The magnet 34 is mounted around the lens barrel 31. An inner diameter of the magnet 34 is slightly larger than the outer diameter of the top end of the lens barrel 31, but smaller than the outer diameter of the bottom end of the lens barrel 31. The magnet 34 is supported on the annular supporting step 312 of the lens barrel 31, and the inner surface of the magnet 34 is fixedly affixed to the outer circumference surface of the lens barrel 31.

The elastic element 33 is located just under the magnet 34 and mounted around the lens barrel 31. The elastic element 33 includes an inner ring 331, an outer ring 333 concentric with the inner ring 331 and three elastic ribs 335 integrally connecting the inner ring 331 with the outer ring 333. An outer periphery of the elastic element 33 is octagon-shaped. The outer ring 333 and the inner ring 331 are spaced from each other along a radial direction. The elastic ribs 335 are evenly disposed along a circumferential direction of the elastic element 33 between the inner ring 331 and the outer ring 333. Each of the elastic ribs 335 occupies approximately one third of a perimeter of the elastic element 33. Each of the elastic ribs 335 connects an outer periphery of the inner ring 331 with an inner periphery of the outer ring 333. The inner ring 331, the outer ring 333 and the elastic ribs 335 are coplanar to each other. Each of the elastic ribs 335 has a first end 3351 connected with the outer ring 333 and an opposite second end 3352 connected with the inner ring 331. A stiffness coefficient of the elastic element 33 along the radial direction of the elastic element 33 is larger than a stiffness coefficient of the elastic element 33 along an axial direction of the elastic element 33. In this embodiment, the elastic element 33 is made of copper, the stiffness coefficient of the elastic element 33 along the radial direction is $3*10^4$ n/m (newton/meter), and the stiffness coefficient of the elastic element 33 along the radial direction is one hundred times of the stiffness coefficient of the elastic element 33 along the axial direction.

When assembled, the lens 32, the lens barrel 31 and the magnet 34 are fixedly connected together to form the moveable section 35 of the lens unit 30. Both the magnet 34 and the elastic element 33 are mounted around the lens barrel 310 and supported by the annular supporting step 312 thereof. The inner ring 331 of the elastic element 33 is sandwiched between the magnet 34 and the supporting step 312 and affixed to a bottom surface of the magnet 34. The outer ring 333 of the elastic element 33 is affixed to a stator of a camera module which has the lens unit 30. Accordingly, the inner ring 331 is connected with magnet 34 and functions as an attachment portion of the elastic element 33 to be connected to the moveable section 35 of the lens unit 30, while the outer ring 333 is connected with the stator and functions as a holding portion of the elastic element 33 for holding the moveable section 35 of the lens unit 30.

Figure 3:
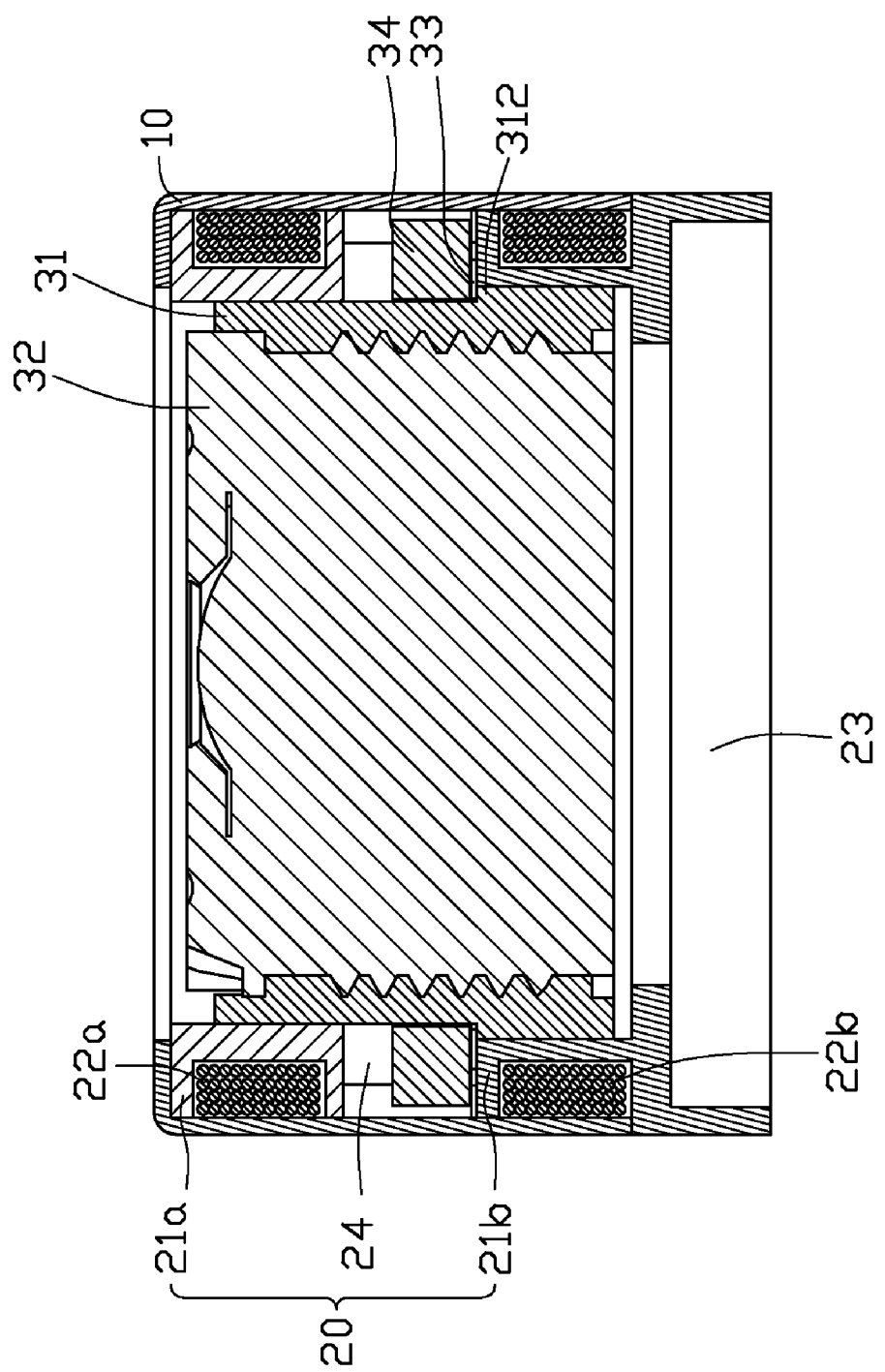
FIG. 3 is a cross-section view of a camera module using the lens unit of FIG. 1.

Referring to FIG. 3, a cross-section view of a camera module using the lens unit 30 is shown. The camera module includes a lens mount 10, the lens unit 30 and a stator 20. The lens unit 30 and the stator 20 are received in the lens mount 10. The stator 20 is mounted around the lens unit 30 for driving the lens unit 30 into telescopic movement.

The stator 20 includes an upper coil seat 21a with an upper coil 22a wound therearound and a lower coil seat 21b with a lower coil 22b wound therearound. The upper coil 22a and the lower coil 22b are winding in directions opposite to each other. A receiving space (not labeled) for receiving the lens unit 30 therein is defined in a center of the stator 20 after the upper coil seat 21a and the lower coil seat 21b are assembled together. The upper coil seat 21a and the lower coil seat 21b are separated a distance from each other and form an annular receiving room 24 therebetween. The receiving room 24 is located around a middle portion of the receiving space and communicates with the receiving space for receiving the magnet 34 and the elastic element 33 therein. The receiving room 24 has a height greater than a sum of the heights of the magnet 34 and the elastic element 33, so that the magnet 34 together with the lens 32 can move telescopically, i.e., along an optical axis direction of the lens 32, between the upper coil seat 21a and the lower coil seat 21b. The outer ring 333 of the elastic element 33 is affixed to the lower coil seat 21b to connect the lens unit 30 and the stator 20 together. Moreover, the lower coil seat 21b defines an inner space 23 in a bottom end for receiving an image sensor (not shown) therein. The image sensor is either a charge coupled device (CCD) sensor or a complementary metal oxide semiconductor (CMOS) sensor.

During operation, electric currents are applied to the upper coil 22a and the lower coil 22b respectively according to an image signal from the image sensor. The upper coil 22a and the lower coil 22b receive the electric currents and accordingly establish an induced magnetic field. The magnetic field of the magnet 34 interacts with the induced magnetic fields of the upper and the lower coils 22a, 22b so that an upward magnetic force is generated. The magnetic force drives the moveable section 35 of the lens unit 30 into telescopic movement along the axial direction of the camera. In other words, the moveable section 35 of lens unit 30 is driven to move upwardly along the optical axis direction of the lens 32. The inner ring 331 and the second ends 3352 of the elastic ribs 335 move together with the moveable section 35 of the lens unit 30. The outer ring 333 and the first ends 3351 of the elastic ribs 335 maintain still. Thus, the elastic ribs 335 of the elastic element 33 are elastically deformed along the optical axial direction, and a downward elastic force is accordingly generated by the upwardly elongated deformation of the elastic ribs 335. When the moveable section 35 of the lens unit 30 moves to a position where the elastic force and the magnetic force reach a balance, the moveable section 35 is therefore stopped at that position, and a focusing action of the camera module is accomplished. When the image detected by the image sensor changes, the intensities of the electric currents applied to each of the upper coil 22a and lower coil 22b are accordingly changed to control the lens unit 30 to move to a corresponding focus position.

Figure 4:
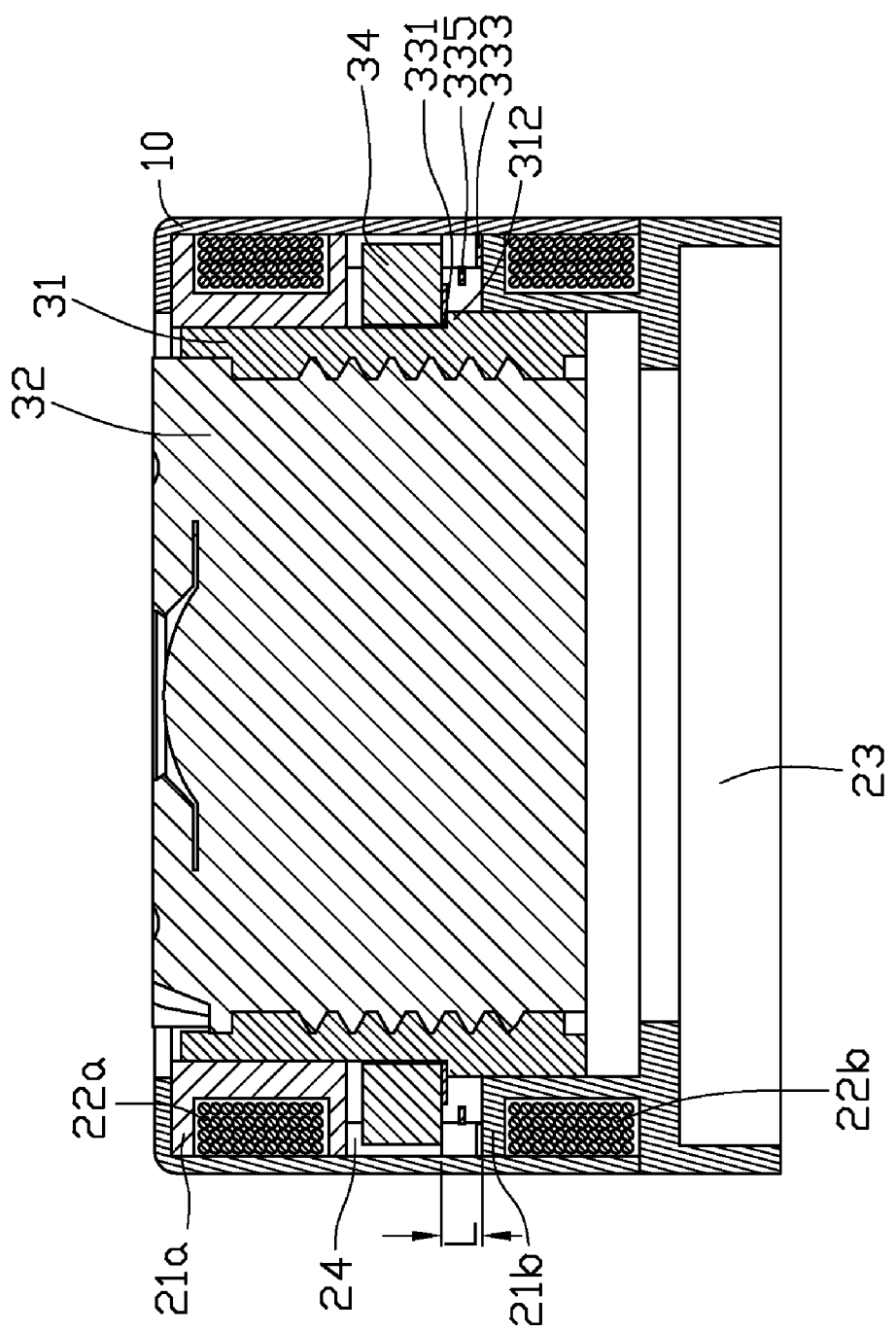
FIG. 4 is another cross-section view of the camera module using the lens unit of FIG. 1, wherein the lens unit stops at a corresponding focus position.

For example, during operation, an electric current of 0.4 A (ampere) is applied to each of the upper coil 22a and the lower coil 22b according to the image signal from the image sensor. The upper coil 22a and the lower coil 22b cooperatively establish an induced magnetic field. The induced magnetic field of the upper and the lower coils 22a, 22b interacts with the magnetic field of the magnet 34. Thus, a magnetic force is generated between the upper and the lower coils 22a, 22b and the magnet 34 to drive the moveable section 35 of the lens unit 30 to move upwardly along the optical axis direction of the lens 32. The second ends 3352 of the elastic ribs 335 of the elastic element 33 move together with the moveable section 35 of the lens unit 30 and are deformed. Referring to FIG. 4, when the moveable section 35 of the lens unit 30 upwardly moves a distance L of 0.2 cm (centimeter) with respect to the lower coil seat 21b, the second end 3352 of each elastic rib 33 also upwardly moves the distance L of 0.2 cm with respect to its first end 3351. If, at this stage, the elastic force generated due to the deformation of the elastic ribs 335 comes to a balance with the magnetic force generated by the interaction between the magnetic field of the magnet 34 and the induced magnetic fields of the upper and the lower coils 22a, 22b, the lens unit 30 stops at its current focal position where the magnet 34 spaces 0.2 cm from the lower coil seat 21b.

In the present camera module, a mapping between the intensities of the electric currents applied to the upper and the lower coils 22a, 22b and the corresponding focus position of the lens unit 30 is pre-established. The movement distance L (i.e., the distance between the corresponding focus position and the lower coil seat 21b) of the moveable section 35 of the lens unit 30 is controlled by the intensities of the electric currents applied to the coils 22a, 22b, while the intensities of the electric currents are determined according to the image detected by the image sensor. When the elastic force generated by the elastic element 33 and the magnetic force generated by interaction between the upper and the lower coils 22a, 22b and the magnet 34 reach a balance, and the lens unit 30 is stopped at the corresponding focus position. Therefore, the magnet 34 is able to precisely stop at different positions between the upper coil seat 21a and the lower coil seat 21b and the lens unit 30 is able to precisely stop at any desired focus positions of the camera module.

In addition, since the elastic ribs 335 are axisymmetric in the axial direction and also axisymmetric in the radial direction, the elastic element 33 is configured such that each of the elastic ribs 335 provides the same spring force; and since the stiffness coefficient of the elastic element 33 along the radial direction is much larger than the stiffness coefficient of the elastic element 33 along the axial direction, force produced during the movement in the plane along the radial direction is refrained; thus, the moveable section 35 of the lens unit 30 is kept to move stably along the optical axis direction of the lens 32. Thus, imbalanced movement of the lens unit 30 is avoided, so that the lens unit 30 can move smoothly and accurately to reach its focus position.

During operation of the present camera module, the inner ring 331 functions as the attachment portion of the elastic element 33 for connecting with the moveable section 35 of the lens unit 30, and the outer ring 333 functions as the holding portion of the elastic element 33 for connecting with the stator 20 of the camera module thereby holding the moveable section 35 of the lens unit 30. Therefore, the second ends 3352 of the elastic ribs 335, which connect with the inner ring 331 and move together with the moveable section 35 of the lens unit 30, function as movable ends; while the first ends 3351 which connect with the outer ring 333 and remain still with the stator 20, function as fixed ends. Alternatively, the attachment portion and the holding portion of the elastic element 33 can be interchangeable, and the moveable ends and the fixed ends of the elastic ribs 335 can be interchangeable accordingly. That is, the inner ring 331 of the elastic element 33 can be directly affixed to the lower coil seat 21 b of the stator 20, whilst the outer ring 333 of the elastic element 33 can be affixed to the bottom surface of the magnet 34. Thus, the outer ring 333 functions as the attachment portion of the elastic element 33, and the inner ring 331 functions as the holding portion of the elastic element 33. Accordingly, when the camera module operates, the first ends 3351 of the elastic ribs 335 move together with the moveable section 35 of the lens unit 30 and function as the movable ends, and the second ends 3352 of the elastic ribs 335 remain still with the stator 20 and function as the fixed ends.

Figure 5:
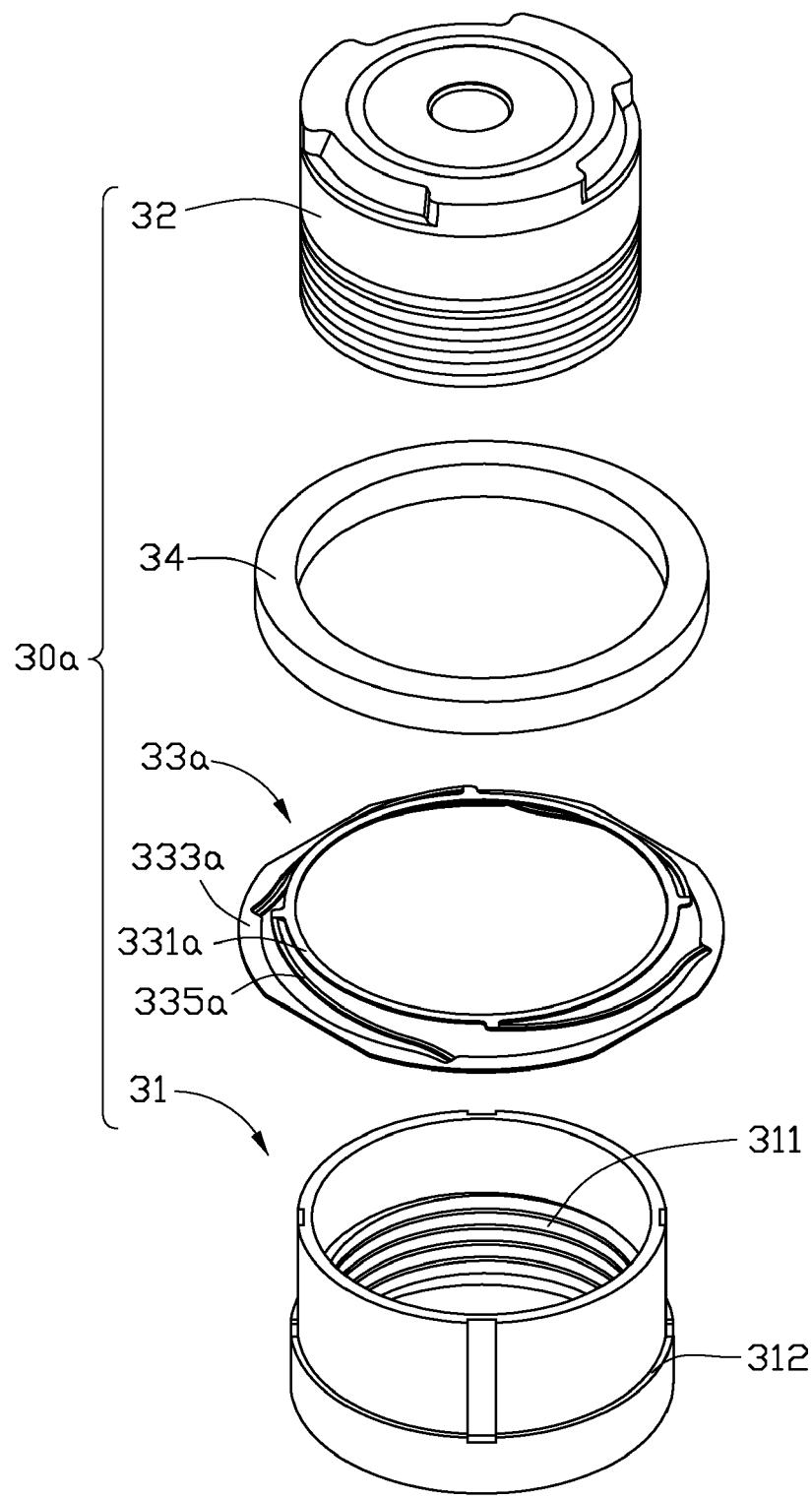
FIG. 5 is an exploded, isometric view showing a lens unit in accordance with a second exemplary embodiment of the present invention.
Figure 6:
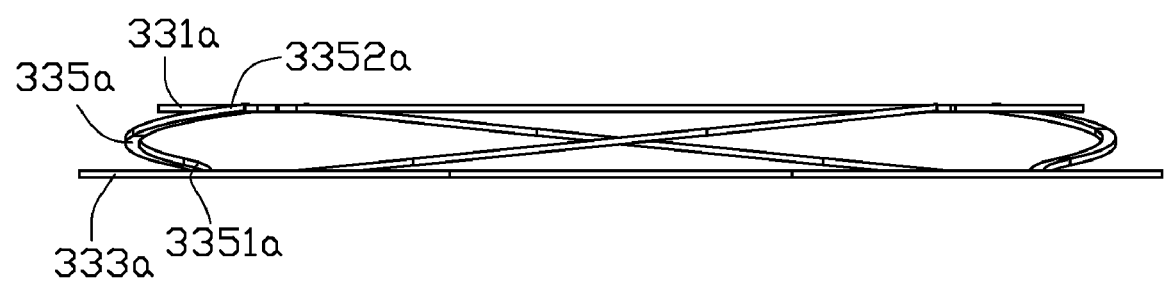
FIG. 6 is a front elevation view of an elastic element of the lens unit of FIG. 5.

FIG. 5 and FIG. 6 illustrate a lens unit 30a in accordance with a second embodiment. Except for the structure of elastic element 33a, other parts of the lens unit 30a in accordance with this second embodiment have substantially the same configurations as the lens unit 30 of the previous first embodiment. Similar to the first embodiment, the elastic element 33a also includes an inner ring 331a, an outer ring 333a and three elastic ribs 335a integrally connecting the inner ring 331a with the outer ring 333a. The inner ring 331a and the outer ring 333a are spaced from each other along the radial direction of the elastic element 33a. Each of the elastic ribs 335a has a first end 3351a connected with the outer ring 333a and a second end 3352a connected with the inner ring 331a. The difference of the second embodiment over the first embodiment is that the inner ring 331a is higher than the outer ring 333a when the elastic element 33a is at a natural state, so that a height difference along an axial direction of the elastic element 33a is formed between the inner ring 331a and the outer ring 333a. Each of the elastic ribs 335a helically extends downwardly from the outer periphery of the inner ring 331a towards the inner periphery of the outer ring 333a.

Figure 7:
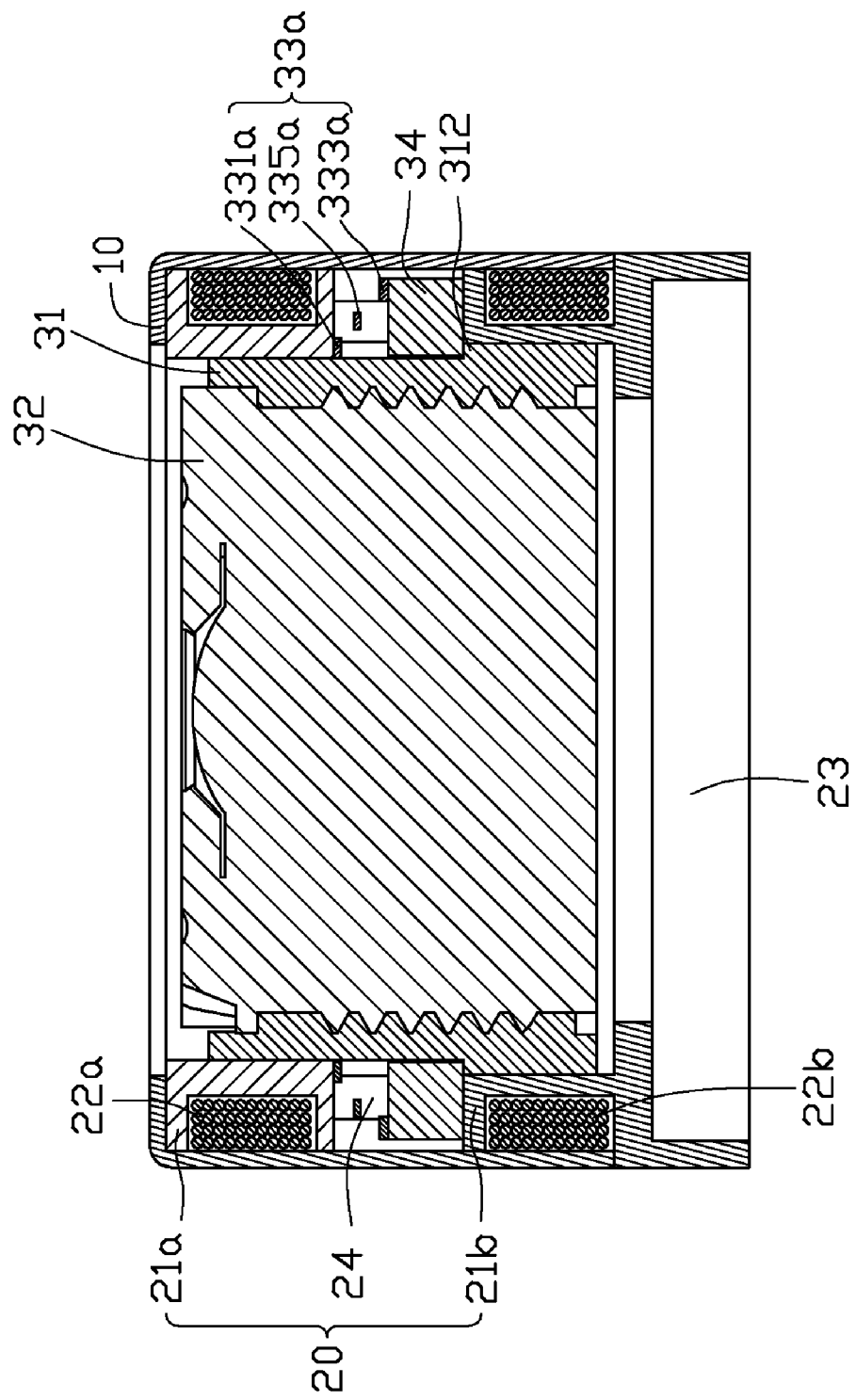
FIG. 7 is a cross-section view of a camera module using the lens unit of FIG. 5.

Referring to FIG. 7, a camera module using the elastic element 33a is shown. The magnet 34 and the elastic element 33a are mounted around the lens barrel 31 and received between the upper coil seat 21a and the lower coil seat 21b of the stator 20. The inner ring 331a is affixed to the upper coil seat 21a and functions as the holding portion of the elastic element 33a, whilst the outer ring 333a is affixed to a top surface of the magnet 34 and functions as the attachment portion of the elastic element 33a. The magnet 34 is supported on the supporting step 312 of the lens barrel 31 and located just under the elastic element 33a.

During operation, the electric currents having corresponding intensities are applied to the upper coil 22a and the lower coil 22b respectively according to the image signal from the image sensor. The upper coil 22a and the lower coil 22b establish induced magnetic fields after receiving the electric currents. The induced magnetic fields of the upper and the lower coils 22a, 22b interact with the magnetic field of the magnet 34 to generate an upward magnetic force which drives the moveable section 35 of the lens unit 30 into telescopic movement along an optical axis direction of the lens 32. As the moveable section 35 of the lens unit 30 moves upwardly, the elastic element 33a is compressed. The first end 3351a of each elastic rib 335a moves together with the moveable section 35 of the lens unit 30 upwardly and the elastic ribs 335a are deformed. A downward elastic force is generated by the elastic element 33a in response to the deformation of the elastic ribs 335a for stopping and maintaining the lens unit 30 at the desired focus position. Therefore, in this embodiment, the first end 3351a of each elastic rib 335a functions as the movable end, and the second end 3352a of each elastic rib 335a functions as the fixed end.

Alternatively, the attachment portion and the holding portion of the elastic element 33a, the moveable ends and the fixed ends of the elastic ribs 335a can be interchangeable, respectively. That is, the outer ring 333a can be affixed to the upper coil seat 21a and functions as the holding portion of the elastic element 33a, whilst the inner ring 331a can be affixed to the top surface of the magnet 34 and functions as the attachment portion of the elastic element 33a. Thus, the second ends 3352a of the elastic ribs 335a move together with the moveable section 35 of the lens unit 30 and function as the movable ends, and the first ends 3351a of the elastic ribs 335a remain still with the stator 20 and function as the fixed ends.

Figure 8:
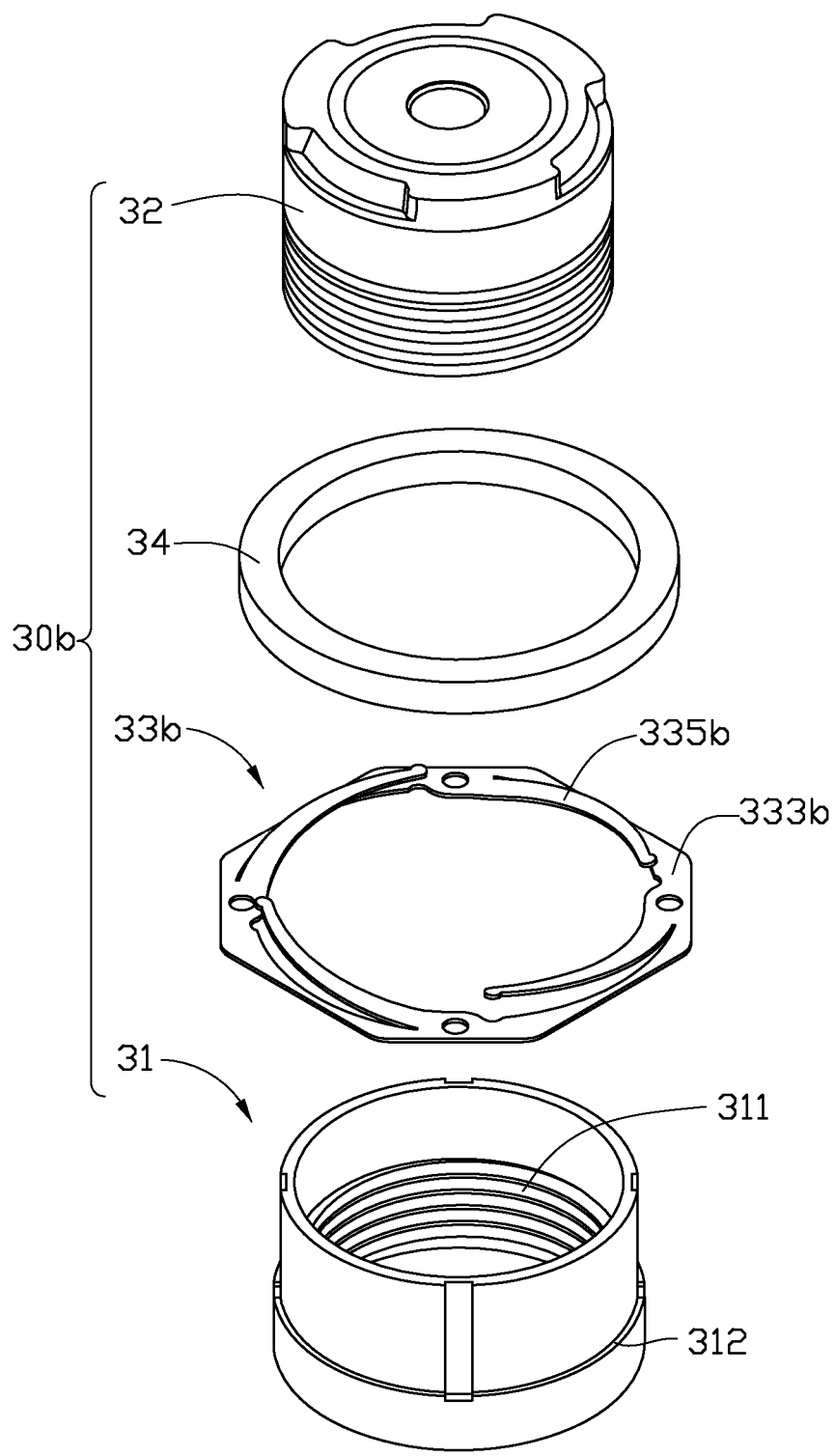
FIG. 8 is an exploded, isometric view showing a lens unit in accordance with a third exemplary embodiment of the present invention.
Figure 9:
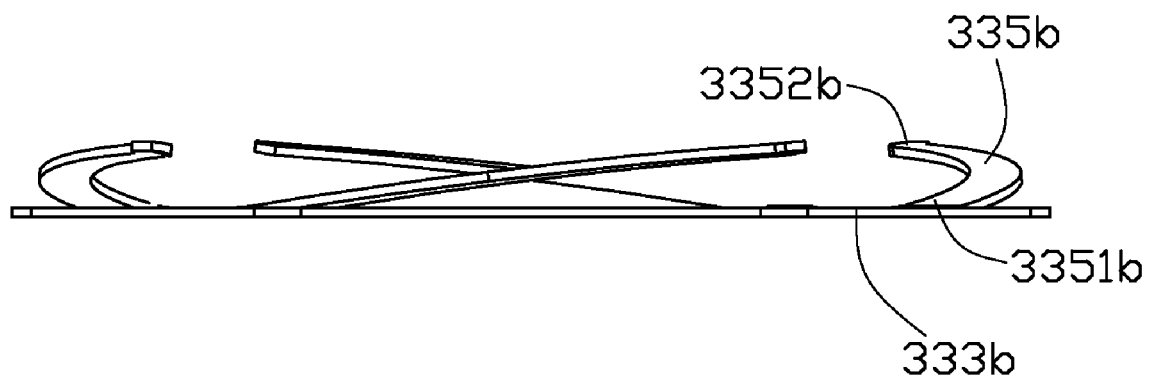
FIG. 9 is a front elevation view of an elastic element of the lens unit of FIG. 8.

FIG. 8 and FIG. 9 illustrate a lens unit 30b in accordance with a third embodiment. Except for the structure of the elastic element 33b, other parts of the lens unit 30b in accordance with this third embodiment have substantially the same configurations as the lens unit 30a of the previous second embodiment. Similar to the second embodiment, the elastic element 33b also includes an outer ring 333b and three elastic ribs 335b helically extending upwardly from the inner periphery of the outer ring 333a. The difference of the third embodiment over the second embodiment is that the elastic element 33b has no inner ring, and each of the elastic ribs 335b has a first end 3351b connected with the outer ring 333b and a second free end 3352b remote from the outer ring 333b. In use, the outer ring 333a is affixed to the stator 20 and functions as the holding portion of the elastic element 33b, and the second free end 3352b of each elastic rib 335b is affixed to the magnet 34 and functions as the attachment portion of the elastic element 33b. Accordingly, the first end 3351b of each elastic rib 335b functions as the fixed end, and the second free end 3352b of each elastic rib 335b functions as the moveable end.

It is to be understood, however, that even though numerous characteristics and advantages of the present invention have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens unit, comprising:
   a moveable section comprising a lens barrel, a lens received in the lens barrel and a magnet fixedly mounted around an outer periphery of the lens barrel, the moveable section being configured to have a telescopic movement along an optical axis of the lens; and
   an elastic element comprising an attachment portion connecting with the moveable section, a holding portion for connecting with a stationary part and holding the movable section, and at least one elastic rib interconnecting the attachment portion and the holding portion and being elastically deformed during the telescopic movement of the moveable section;
   wherein the at least one elastic rib of the elastic element is configured to restrain a movement of the moveable section when the movable section is telescoped, whereby the moveable section can stop at a focal position when an elastic force generated by the deformation of the at least one elastic rib is equal and opposite to a force for causing the moveable section to have the telescopic movement.

2. The lens unit of claim 1, wherein the elastic element comprises an inner ring and an outer ring concentric with the inner ring, the inner ring and the outer ring being spaced from each other along a radial direction of the elastic element, the at least one elastic rib connecting the inner ring with the outer ring.

3. The lens unit of claim 2, wherein the outer ring connects with a stator of a camera module which has the lens unit so that the outer ring functions as the holding portion of the elastic element, and the inner ring connects with the magnet so that the inner ring functions as the attachment portion of the elastic element.

4. The lens unit of claim 2, wherein the inner ring connects with a stator of a camera module which has the lens unit so that the inner ring functions as the holding portion of the elastic element, and the outer ring connects with the magnet so that the outer ring functions as the attachment portion of the elastic element.

5. The lens unit of claim 2, wherein the inner ring, the outer ring and the at least one elastic rib are coplanar to each other.

6. The lens unit of claim 5, wherein a supporting step is formed on an outer circumferential surface of the lens barrel, the inner ring is sandwiched between the magnet and the supporting step and affixed to a bottom surface of the magnet, the inner ring functions as the attachment portion of the elastic element, the outer ring of the elastic element is affixed to a stator of a camera module which has the lens unit, and the outer ring functions as the holding portion of the elastic element.

7. The lens unit of claim 5, wherein the inner ring is fixed to a stator of a camera module which has the lens unit, the inner ring functions as the holding portion of the elastic element, the outer ring is fixed to a bottom surface of the magnet, and the outer ring functions as the attachment portion of the elastic element.

8. The lens unit of claim 2, wherein one of the inner and the outer rings is located at a higher level than the other one of the inner and the outer rings, and a height difference along an axial direction of the elastic element is formed between the inner ring and the outer ring when the elastic element is at a natural state.

9. The lens unit of claim 8, wherein a supporting step is formed on an outer side surface of the lens barrel for supporting the magnet thereon, the outer ring is affixed to a stator of a camera module which has the lens unit, the outer ring functions as the holding portion of the elastic element, the inner ring is affixed to a top surface of the magnet, and the inner ring functions as the attachment portion of the elastic element.

10. The lens unit of claim 8, wherein a supporting step is formed on an outer side surface of the lens barrel for supporting the magnet thereon, the inner ring is affixed to a stator of a camera module which has the lens unit, the inner ring functions as the holding portion of the elastic element, the outer ring is affixed to a top surface of the magnet, and the outer ring functions as the attachment portion of the elastic element.

11. The lens unit of claim 2, wherein the at least one elastic rib has a plurality in number, the plurality of elastic ribs are evenly disposed along a circumferential direction of the elastic element between the inner ring and the outer ring, and each of the elastic ribs occupies approximately an equal part of a perimeter of the elastic element.

12. The lens unit of claim 1, wherein the elastic element comprises an outer ring connected with a stator of a camera module which has the lens unit, the at least one elastic rib has a first end integrally connected with an inner periphery of the outer ring and an opposite second end connected with the magnet, the outer ring functions as the holding portion of the elastic element, and the second end of the at least one elastic rib functions as the attachment portion of the elastic element.

13. The lens unit of claim 12, wherein the at least one elastic rib has a plurality in number, the plurality of elastic ribs are evenly disposed along a circumferential direction of the outer ring, the second end of each elastic rib is located at a level different from that of the first end, and a height difference along an axial direction of the elastic element is formed between the first ends and the second ends of the elastic ribs when the elastic element is at a natural state.

* * * * *